Dec. 17, 1929.  R. J. CRACKNELL  1,739,544
REFRIGERATION
Filed Feb. 16, 1928
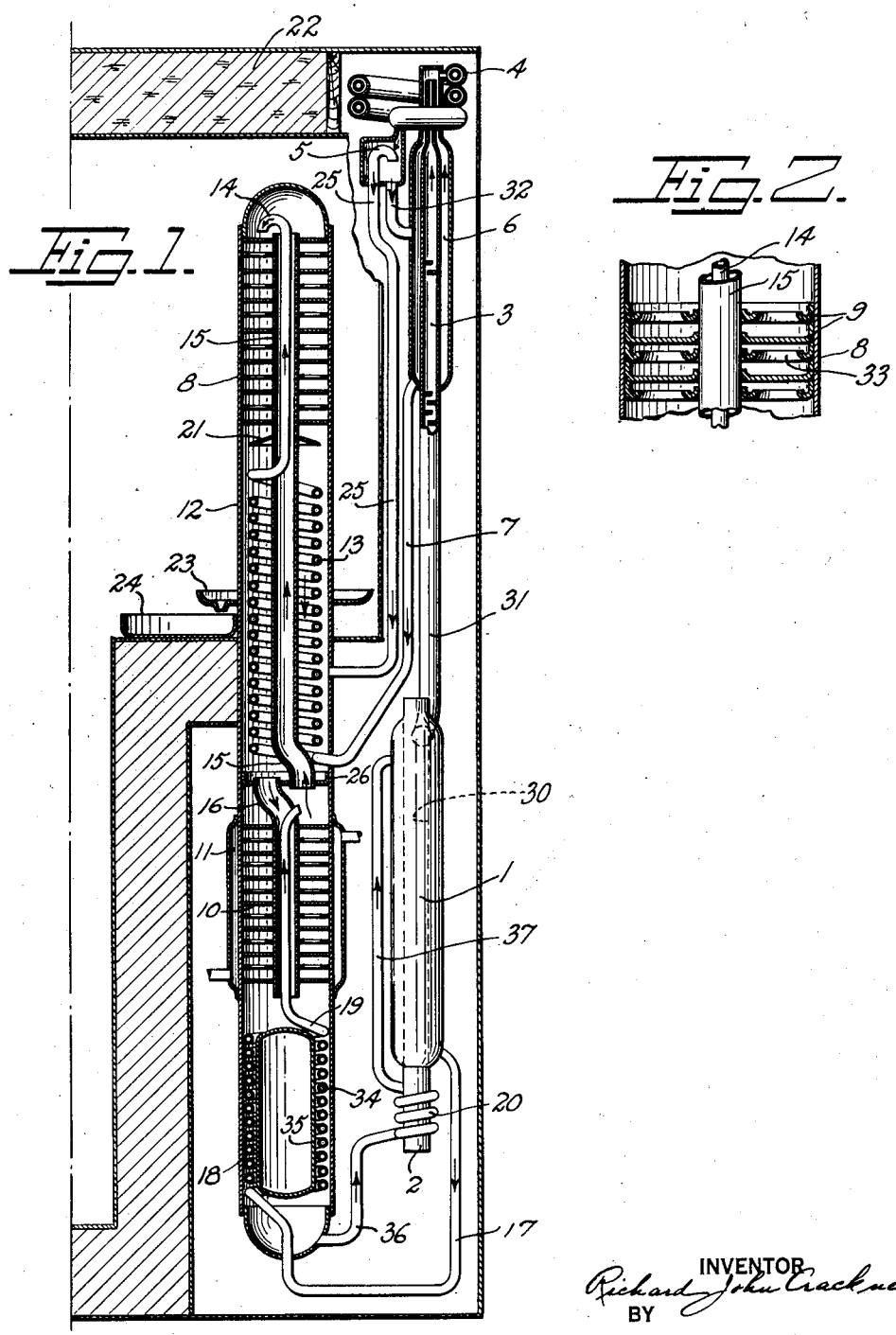

Patented Dec. 17, 1929

1,739,544

UNITED STATES PATENT OFFICE

RICHARD JOHN CRACKNELL, OF LONDON, ENGLAND, ASSIGNOR TO ELECTROLUX SERVEL CORPORATION, OF NEW YORK, N. Y., A CORPORATION OF DELAWARE

REFRIGERATION

Application filed February 16, 1928, Serial No. 254,714, and in Great Britain February 18, 1927.

This invention relates to refrigerating apparatus of the absorption type and particularly to such apparatus wherein a pressure equalizing auxiliary medium is used.

One purpose of the present invention is to provide a novel refrigerating apparatus of the above type wherein a compact unitary arrangement of parts is obtained and particularly wherein the evaporator, absorber and heat exchangers are arranged in a unitary structure.

The nature of the invention will be apparent from the following description taken in connection with the accompanying drawing on which:

Fig. 1 is a sectional view of a refrigerator containing refrigerating apparatus constructed in accordance with the present invention, the refrigerating apparatus being shown partly in section; and Fig. 2 is a cross-sectional view of the portion of the structure of Fig. 1.

Referring more particularly to Fig. 1 reference character 1 designates a generator containing a solution of refrigerant which may, for example, be ammonia in water, the water constituting the absorption liquid. The generator is heated by any suitable device such as electrical heating element 2. A flue 30 extends through the generator so that the same may be heated by gas. The upper part of the generator is connected by means of conduit 31 to a rectifier 3, the refrigerant passage of which is formed as an extension of conduit 31. The rectifier is connected with a condenser 4 which may be cooled by suitable means such as water or air. A water cooling jacket is shown on the drawing. Connected to the condenser is an outer jacket 6 forming part of rectifier 3. The lower part of the condenser is connected to a vessel 5. Conduit 32 connects this vessel to jacket 6.

The evaporator and the absorber of the system of apparatus are formed within and by a long cylindrical drum 8. The extent of this drum into the space to be cooled and into the outer space of the refrigerator can be readily seen on the drawing. Drum 8 is divided by a plate 26 into what I term an evaporator portion and an absorber portion. The evaporator portion is that part of the drum which is above plate 26 and the absorber portion is that part of the drum which is below plate 26. The reason for this terminology is that the evaporator is in the evaporator portion and the absorber is in the absorber portion. The upper portion of the evaporator portion forms the evaporator. A series of disks 9, such as shown in Fig. 2, having apertures are superimposed and are fitted into the drum 8. Holes 33 are arranged in staggered relation so as to make a tortuous passageway for gas. Small holes are also provided for passage of liquid. These may be arranged in any desired manner but are preferably placed so that a tortuous passage for liquid is obtained. There are holes 33 and preferably also separate holes for liquid in each of the disks 9.

Extending centrally through the apertures in disks 9 is a conduit 15 which extends below the evaporator disks and passes through plate 26 and gives access between the top of the absorber portion and the top of the evaporator portion. The portion of the drum indicated at 12 between the lowermost disk 9 and plate 26 is a heat exchanger. This heat exchanger contains a coil 13, the bottom of which is connected by means of conduit 7 with jacket 6 and the top of which is connected by means of conduit 14 with the space above the uppermost evaporator disk.

The absorber 10 is surrounded by a water cooling jacket 11. It also contains disks similar to the evaporator disks. A central conduit 16 passes through the absorber disks and passes through plate 26 to give access between the lowermost portion of the evaporator drum and the space below the absorber disks. Below the absorber disks is a heat exchanger for liquid indicated generally at 18 and comprising a coil 34 surrounding a hollow displacement member 35. The upper end of coil 34 is connected to the space above the upper absorber disk by means of pipe 19 which passes through conduit 16. The lowermost part of the absorber portion is connected by conduit 36 with a thermo-siphon coil 20 which in turn is connected by conduit 37 with the upper part of the generator. A conduit 17 connects the lower part of the generator with the bottom of coil 34.

A vent pipe 25 connects vessel 5 with the gas exchanger 12.

Mounted on the upper surface of pipe 15 is a baffle member 21 so arranged that any unevaporated liquid refrigerant passing through the evaporator is directed onto the coil 13.

The evaporator and the upper part of the heat exchanger are located within the cooling chamber of the refrigerating cabinet designated generally by reference character 22 and a drip tray 23 and a receptacle 24 are provided.

A casting containing pockets for ice trays is preferably arranged around the evaporator.

The operation of the apparatus is as follows:—

Vaporous refrigerant expelled from solution in the generator 1 rises through pipe 31 and passes through rectifier 3 where entrained water is separated out and thence into condenser 4. This refrigerant flows into vessel 5 and thence into jacket 6 where it serves as a rectifying medium. From jacket 6 the liquid refrigerant passes through conduit 7 and to coil 13. Vapor generated in jacket 6 passes upwardly into condenser 4. An auxiliary medium such as hydrogen is contained in the drum 8. A mixture of hydrogen and refrigerant, namely, ammonia, is present around coil 13. This mixture has passed out of the evaporator and is cold. This cold mixture of gases cools the liquid refrigerant in coil 13 and thus cools the liquid refrigerant prior to its entry into the evaporator through conduit 14. Relatively pure hydrogen passes through conduit 15 and is also cooled by the surrounding mixture of cold gases leaving the evaporator. Baffle member 21 directs unevaporated refrigerant onto coil 13 where it is evaporated and serves to cool the liquid refrigerant. The heavier mixture of gases passes downwardly through conduit 16 and to the space below the absorber disks. Weak absorption liquid is supplied to the absorber disks through conduit 19 and absorbs the ammonia liberating the hydrogen which passes upwardly through conduit 15. The strong absorption liquid falls down onto member 35 and passes in contact with coil 34 thus cooling the warmer weak absorption liquid in coil 34. By arranging conduit 19 within conduit 16 the weak absorption liquid is pre-cooled by the gaseous mixture leaving the evaporator. Strong absorption liquid is lifted by thermo-siphon coil 20 to the generator. Weak absorption liquid flows by gravity from the generator through conduit 17 to coil 34.

The arrangement above described is of practical value in that it provides a minimum of welded joints.

Having thus described my invention, what I claim is:

1. Refrigerating apparatus comprising a cylindrical drum, a plate dividing the drum into an evaporator portion and an absorber portion, absorber disks in the absorber portion, a gas conduit connected to the evaporator portion passing through the absorber disks, a heat exchanger, a conduit connected to the heat exchanger passing through said gas conduit and arranged to discharge liquid on the absorber disks, a generator, conduits connecting the generator with the heat exchanger, the heat exchanger being arranged to receive liquid from the absorber disks, evaporation means in the evaporator portion and means connecting the evaporation means with the generator including a condenser.

2. Refrigerating apparatus comprising a vertical cylindrical drum, means dividing the drum into an evaporator and an absorber, evaporator disks in the upper part of the drum, a heat exchanger in the drum below the evaporator disks, absorber disks in the drum below the heat exchanger, a second heat exchanger in the drum below the absorber disks, conduits within the drum connecting the absorber with the evaporator and the heat exchangers with the evaporator and absorber, a generator and a condenser outside the drum and conduits connecting the generator and condenser with the heat exchangers and with each other.

3. Refrigerating apparatus comprising a vertical cylindrical drum, a transverse plate dividing the drum into an evaporator portion and an absorber portion, a coil in the lower part of the upper portion, a series of disks above the coil, a conduit connecting the upper end of the coil with a space above the disks, a conduit connecting the absorber portion with the space above the disks, a condenser connected to the bottom of the coil, a coil in the lower part of the lower portion, a series of disks above the coil in the lower portion, a conduit connecting the last-mentioned coil with a space above the disks in the absorber portion, a generator connected to the last-mentioned coil, means to conduct liquid from the lower part of the lower portion to the generator and means to conduct vapor from the generator to the condenser.

4. Refrigerating apparatus comprising a vertical cylindrical drum, a transverse plate dividing the drum into an evaporator portion and an absorber portion, a conduit passing through the plate and connecting the absorber portion with the upper part of the evaporator portion, a conduit passing through the plate and connecting the evaporator portion with the absorber portion, liquid distributing means in the evaporator portion, a liquid refrigerant supply conduit in the evaporator portion below the liquid distributing means, a condenser connected to the liquid refrigerant supply conduit, an absorption liquid pipe in the absorber portion at the lower part thereof, a generator connected to the absorption liquid pipe, means to conduct absorption liquid from the absorber portion to the generator and means to conduct vapor from the generator to the condenser.

5. Refrigerating apparatus comprising an absorber comprising a series of disks, an evaporator comprising a series of disks, means for circulating gaseous fluid through the evaporator and the absorber comprising a conduit extending through the disks in the evaporator and a conduit extending through the disks in the absorber, a generator and connections between the generator and the absorber comprising a conduit extending within the gas conduit passing through disks in the absorber.

6. Refrigerating apparatus comprising a generator, a condenser, an evaporator, an absorber, a heat exchanger for transferring heat from liquid refrigerant and gaseous fluid entering the evaporator to gaseous fluid leaving the evaporator, a liquid heat exchanger for exchanging heat between strong and weak absorption liquid, connections between the aforementioned parts, the evaporator, the heat exchangers and the absorber being arranged in a vertical cylindrical drum.

7. Refrigerating apparatus comprising a generator, a condenser, an evaporator, an absorber, a heat exchanger for transferring heat from liquid refrigerant and gaseous fluid entering the evaporator to gaseous fluid leaving the evaporator, a liquid heat exchanger for exchanging heat between strong and weak absorption liquid, connections between the aforementioned parts, the evaporator, the heat exchangers, and the absorber being arranged in a single unitary structure.

8. An evaporator for a refrigerating apparatus comprising a cylindrical drum, a series of disks in said drum having apertures through the same, a conduit for conducting gaseous fluid passing through the disks, a baffle member attached to said conduit below the disks to receive liquid dropping from the disks and means for supplying liquid to the upper portion of the evaporator.

9. A hermetically sealed refrigerating apparatus comprising a unitary structure comprising an evaporator and an absorber, means for circulating gaseous fluid through the evaporator and absorber due to force generated within the hermetically sealed apparatus comprising conduits extending wholly within said unitary structure, a generator, a condenser and conduit means connecting the absorber, generator, condenser and evaporator.

10. An evaporator for a refrigerating apparatus comprising a cylindrical drum, a series of disks in said drum having apertures therethrough, a conduit for conducting gaseous fluid passing through said disks, a conduit in the form of a coil for conducting liquid refrigerant disposed below said disks, means for conducting liquid refrigerant from said coil to the upper portion of said evaporator and means directing liquid dropping from the disks onto said coil.

In testimony whereof I affix my signature.
RICHARD JOHN CRACKNELL.